2,915,333
IRRIGATION PIPE CARRIER

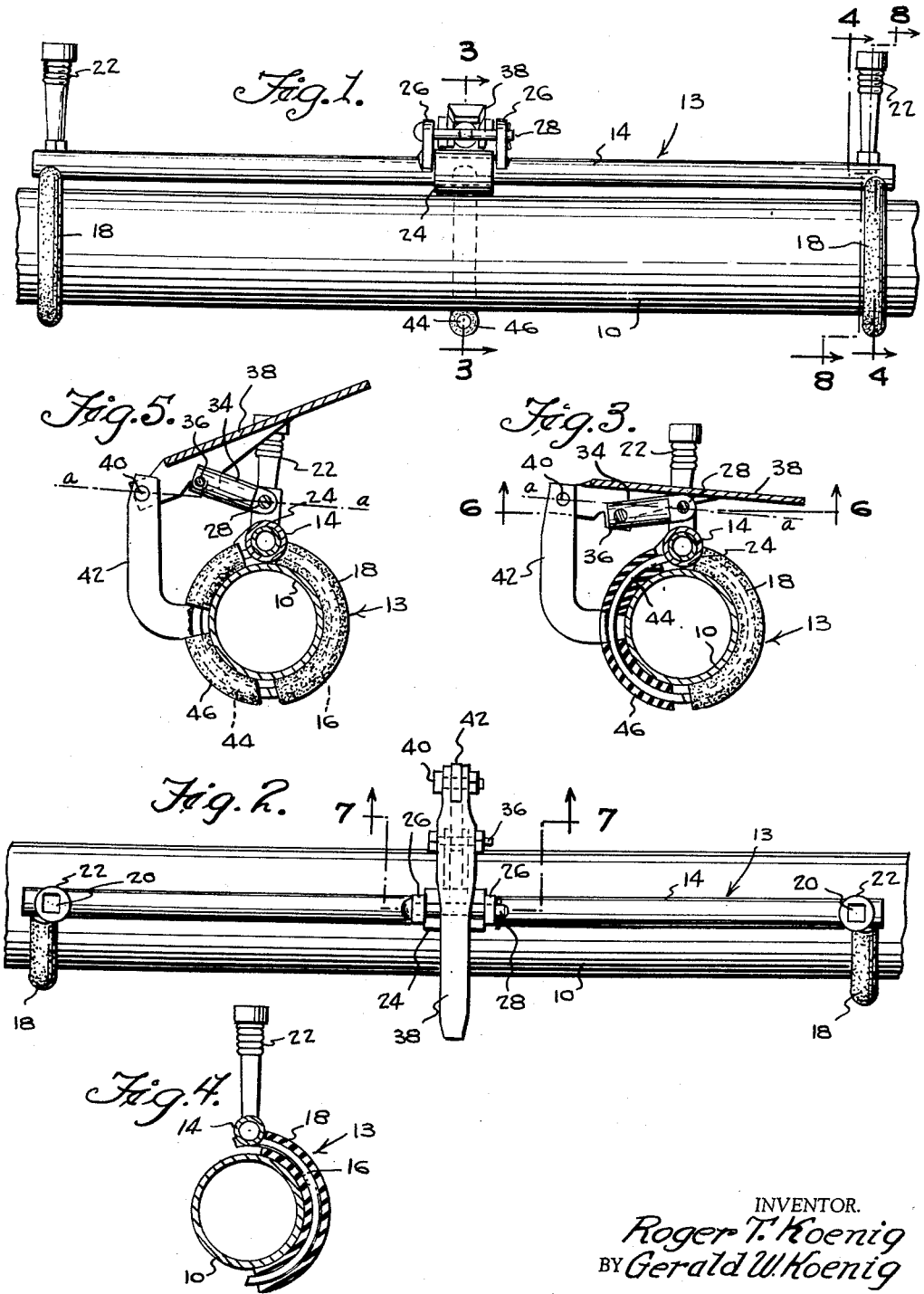

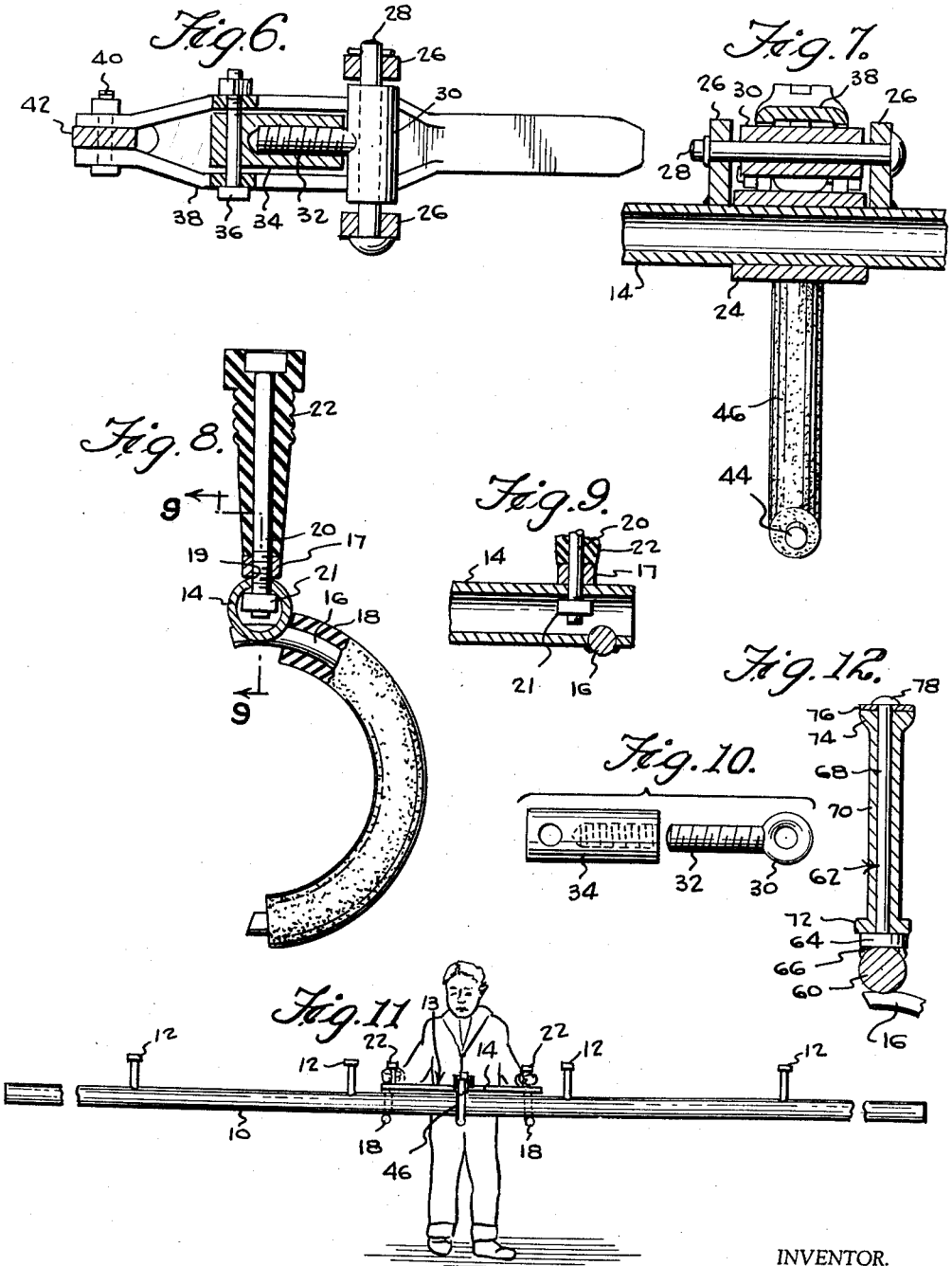

Roger T. Koenig and Gerald W. Koenig, Yuma, Colo.

Application June 14, 1957, Serial No. 665,729

5 Claims. (Cl. 294—104)

This invention, relating generally to improvements in the art of pipe carrier manufacture, has a more specific reference to a clamp-type, one-man carrier device for irrigation tubing and the like.

Among important objects of the invention are the following:

To effect quick attachment or detachment of the carrier;

To provide maximum control for the user;

To prevent rotation of the tubing while being carried;

To add to a minimum extent to the weight of the tubing itself;

To provide for easy and swift operation of the carrier; and

To assure effective and sure locking of the device to the tubing.

Other objects will appear from the following description, the claims appended thereto, and from the annexed drawing, in which like reference characters designate like parts throughout the several views, and wherein:

Figure 1 is a front elevation of the carrier applied to a pipe, only a fragment of which is shown;

Figure 2 is a top plan view;

Figure 3 is a section on line 3—3 of Figure 1;

Figure 4 is a section on line 4—4 of Figure 1;

Figure 5 is a view like Figure 3 with the clamp released;

Figure 6 is an enlarged section on line 6—6 of Figure 3;

Figure 7 is an enlarged section on line 7—7 of Figure 2, with the pipe not shown;

Figure 8 is an enlarged section on line 8—8 of Figure 1 with the pipe not shown;

Figure 9 is a detail section on the same scale as Figure 8, on line 9—9 of Figure 8;

Figure 10 is an exploded view in side elevation of an adjustable link;

Figure 11 is a reduced elevational view of the device in use, showing the manner in which it would be gripped by a user; and Figure 12 is a fragmentary detail cross-sectional view of a modified form of the handle and support means for the carrier.

Referring to the drawings in detail, an elongated irrigation pipe 10 to be carried includes the usual nozzles 12.

The carrier 13 constituting the invention includes an elongated, tubular, straight support member 14 having at its ends downwardly opening notches in which are welded one end of arcuate support arms 16 (Figures 4 and 8) curved through 180° about pipe 10 and covered with protective rubber sleeves 18. While the support member has been described and illustrated as having a "tubular" configuration, it will be understood that it may comprise an elongated substantially solid rod or shaft which may have any geometrical transverse cross-sectional configuration without departing from the spirit and scope of this invention. Bolts 20, extending radially upwardly from member 14, are threaded into nuts 21 within the members, the bolts being extended through openings 19 of the member and being locked against accidental separation from the member by jam nuts 17 (see Figures 8 and 9). The bolts extend through rubber handles 22.

A sleeve 24 receives the midlength part of member 14. Adjacent the opposite ends of sleeve 24, ears 26 are welded to and project upwardly from member 14. These have aligned openings receiving a pivot pin 28 extending parallel to sleeve 24 through a sleeve 30 rigid with a radial, threaded stud 32 (Figures 6 and 10). Stud 32 is engaged in a threaded socket element 34 pivotally connected by a pin 36, that extends parallel to sleeve 30, to the intermediate portion of a handle 38.

Handle 38 pivots on a pin 40 carried by the outer end of an L-shaped arm 42. Arm 42 is rigid with an arcuate clamp arm 44 rubber-covered at 46 and curved through 180° oppositely to arms 16.

The pivot points 28, 36, and 40 are so arranged that the point 36 will move across a dead center, that is, a line drawn straight between points 28, 40. The portion of handle 38 that extends from its proximal end to the pin 36, and the adjustable link defined by socket member 34 and stud 32, form a toggle that locks as shown in Figure 3, on movement of pin 36 toward the supported pipe across a dead center.

In use, handle 38, when swung counterclockwise about its pivot 40 from its Figure 5 position, will swing arm 44 to the left in Figure 5 out of engagement with the pipe 10. In other words, when the toggle is unlocked as in Figure 5, one can swing arm 44 clockwise about member 14, away from the pipe 10. Arm 42 will be carried to the left with arm 44, traveling clockwise about member 14. Handle 38 will be carried upwardly, with the handle being caused to turn counterclockwise about pin 40 due to the fact that pin 40 is travelling clockwise about member 14 while pin 36 is also travelling clockwise about member 14 but on a smaller radius than pin 40. Link means 34, 32 is swinging clockwise about member 14.

To clamp the device to a pipe, the procedure is reversed. One simply places the fixed clamp arms 16 on the pipe, swings the movable arm 44 into position against the pipe to locate the parts as in Figure 5, and then throws handle to its Figure 3 position to move pin 36 over a dead center and lock the toggle.

Figure 12 illustrates a second embodiment of the invention. In this form reference numeral 60 designates an elongated solid cylindrical support bar member or rod which serves the same functions as the tubular support member 14. As before, the support bar 60 is provided with downwardly opening notches in which are welded one end of the arcuate support arms 16. Bolts 62 are substituted for the bolts 20 and extend radially and upwardly from the member 60 and have their respective heads 64 welded or otherwise fixedly secured at 66 thereto. The shanks 68 of the bolts 62 extend through hollow tubular rubber handles 70 having lower and upper integral flanges 72 and 74, respectively. As is seen in Figure 12, the flanges 72 abut against the heads 64, and the shanks 68 project slightly above the upper ends of the flanges 74 to receive annular members 76 thereon. The members 76 engage against and are supported on the flanges 74, and rivet means 78 fixedly secure the annular members 76 on the shanks 62 to prevent accidental or inadvertent separations of the handles 70 therefrom.

In all other respects the two embodiments of the invention are identical.

With further reference to the arrangement and the functional relationship of the several components of the invention, in both embodiments thereof, it is appropriate to note that the axis of rotation of the sleeve 24 can be considered as a first axis. A second axis is defined by pivot point 28, a third axis by the pivot point 40, and a fourth axis by the pivot point 36. All these axes are parallel.

It is also appropriate to note, to obtain a clear understanding of the construction and operation, that the straight line drawn between points 28, 40 and mentioned previously in this description, has been shown as a dotted line in Figures 3 and 5, designated a—a.

Referring now to Figure 5, when the clamp arms 16, 44 are in pipe-releasing position, the first and fourth axes will be at opposite sides of the straight line a—a, which line is normal to the axes of sleeve 24 and of the toggle links. This is so, because in Figure 5 the clamp arms, though both engaged with the pipe, are in their unlocked position as previously brought out in this description, the description hereinbefore provided further going into the characteristic wherein movement of arm 44 to the left from its Figure 5 position will be accompanied by travel of point 36 clockwise from its Figure 5 position.

Conversely, when the clamp arms are in their pipe-gripping positions, shown in Figure 3, the point 36 travels across the line a—a previously brought out herein. Therefore, the first and fourth axes will now be disposed at the same side of the line a—a. This produces the locking action previously discussed herein.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A pipe carrier comprising an elongated support member; a pair of first arcuate clamp arms rigid with said support member at the opposite ends of the member, said first arms being adapted to straddle a pipe along which the support member extends; at least one second arcuate clamp arm also adapted for straddling said pipe, the second arm being pivoted upon the support member medially between the ends of the support member to swing toward and away from the first arms, the first and second arms being disposed in confronting relation and being oppositely bowed for gripping a pipe on swinging of the second toward the first arms; an operating arm connected to and extending outwardly from the second clamp arm; and a pair of toggle links pivotally connected between the support member and said operating arm respectively and pivotally connected to each other at a location between said support member and operating arm, said links being movable about their pivotal connections to the support member and operating arm between locking and unlocking positions, the pivotal connection of the links to each other being moved in the locking position of the links toward the support member across a straight line drawn between the points at which the links are connected to the support member and operating arm, thus to lock the second clamp arm against swinging movement out of its pipe-gripping position.

2. A pipe carrier comprising an elongated support member; a pair of first arcuate clamp arms rigid with said support member at the opposite ends of the member, said first arms being adapted to straddle a pipe along which the support member extends; at least one second arcuate clamp arm also adapted for straddling said pipe, the second arm being pivoted upon the support member medially between the ends of the support member to swing toward and away from the first arms, the first and second arms being disposed in confronting relation and being oppositely bowed for gripping a pipe on swinging of the second toward the first arms; an operating arm connected to and extending outwardly from the second clamp arm; and a pair of toggle links pivotally connected between the support member and said operating arm respectively and pivotally connected to each other at a location between said member and operating arm, said links being movable about their pivotal connections to the support member and operating arm between locking and unlocking positions, the pivotal connection of the links to each other being moved in the locking position of the links toward the support member across a straight line drawn between the points at which the links are connected to the support member and operating arm, thus to lock the second clamp arm against swinging movement out of its pipe-gripping position, said support member being of externally circular cross section at least at the location of the pivotal connection of the second arm thereto, said pivotal connection of the second arm to the support member comprising a sleeve receiving and freely rotatable upon the support member at said location, one of the links being connected to the support member and the other to the operating arm, the connection of said one link to the support member comprising a pair of ears rigid with and projecting outwardly from the support member in close proximity to the opposite ends of the sleeve to constitute abutments limiting the sleeve against endwise movement on the support member, and a pin extending between the ears, said one link rocking about said pin.

3. A pipe carrier comprising an elongated support member; a pair of first arcuate clamp arms rigid with said support member at the opposite ends of the member, said first arms being adapted to straddle a pipe along which the support member extends; at least one second arcuate clamp arm also adapted for straddling said pipe, the second arm being pivoted upon the support member medially between the ends of the support member to swing toward and away from the first arm, the first and second arms being disposed in confronting relation and being oppositely bowed for gripping a pipe on swinging of the second toward the first arms; an operating arm connected to and extending outwardly from the second clamp arm; a pair of toggle links pivotally connected between the support member and said operating arm respectively and pivotally connected to each other at a location between said member and operating arm, said links being movable about their pivotal connections to the support member and operating arm between locking and unlocking positions, the pivotal connection of the links to each other being moved in the locking position of the links toward the support member across a straight line drawn between the points at which the links are connected to the support member and operating arm, thus to lock the second clamp arm against swinging movement out of its pipe-gripping position; and a pair of carrying handles rigid with the support member at its opposite extremities and formed as straight bars radiating from the support member in a common plane.

4. A pipe carrier comprising: a support member; a sleeve concentric with said member and rotatable thereon about a first axis; a pair of opposed clamp arms proportioned for gripping between them a pipe to be carried, one arm being rigid at one end with the sleeve and the other arm being rigid at its corresponding end with the support member, said arms being relatively swingable toward and away from each other about said first axis between pipe-gripping and pipe-releasing positions respectively; a first toggle link having a connection at one end to the support member for swinging movement about a second axis parallel to the first axis; a support arm having a fixed connection at one end to said one clamp arm, said support arm extending outwardly from said one clamp arm and terminating at its other end outwardly from the first link in laterally spaced relation to the sleeve and support member; and a second toggle link having one end pivotally connected to the other end of said support arm on a third axis disposed parallel to the first axis at a greater distance therefrom than the distance between the first and second axes, said second toggle link being pivotally connected to the other end of the first toggle link about a fourth axis disposed parallel to the axis of sleeve rotation in the space between the second and third axes, said second and third axes being aligned along a straight line normal to the several axes, the first and fourth axes being disposed at opposite sides of said line in the pipe-releasing position of the clamp arms and being disposed at the same side of said line in the pipe-gripping position of the clamp arms.

5. A pipe carrier as in claim 4, wherein said first toggle link comprises a socket member having a threaded axial recess opening upon one end thereof, and a stud engageable in said recess so as to be adjustable longitudinally of said socket member, said fourth axis traveling in an arcuate path about the second axis during movement of the clamp arms between the pipe-gripping and pipe-releasing positions thereof with the first toggle link being adjustable as to length so as to provide for selected, corresponding adjustments in the length of the radius of the arcuate path within which said fourth axis travels about the second axis.

References Cited in the file of this patent

UNITED STATES PATENTS

| | | |
|---|---|---|
| 2,536,932 | Heppenstall | Jan. 2, 1951 |
| 2,597,760 | Strahm | May 20, 1952 |
| 2,637,088 | Foster | May 5, 1953 |
| 2,658,786 | Ziese | Nov. 10, 1953 |
| 2,665,162 | Moore et al. | Jan. 5, 1954 |
| 2,819,111 | Cozzens | Jan. 7, 1958 |